G. E. HENRY.
KITCHEN UTENSIL.
APPLICATION FILED SEPT. 13, 1916.
1,237,040.
Patented Aug. 14, 1917.
2 SHEETS—SHEET 1.
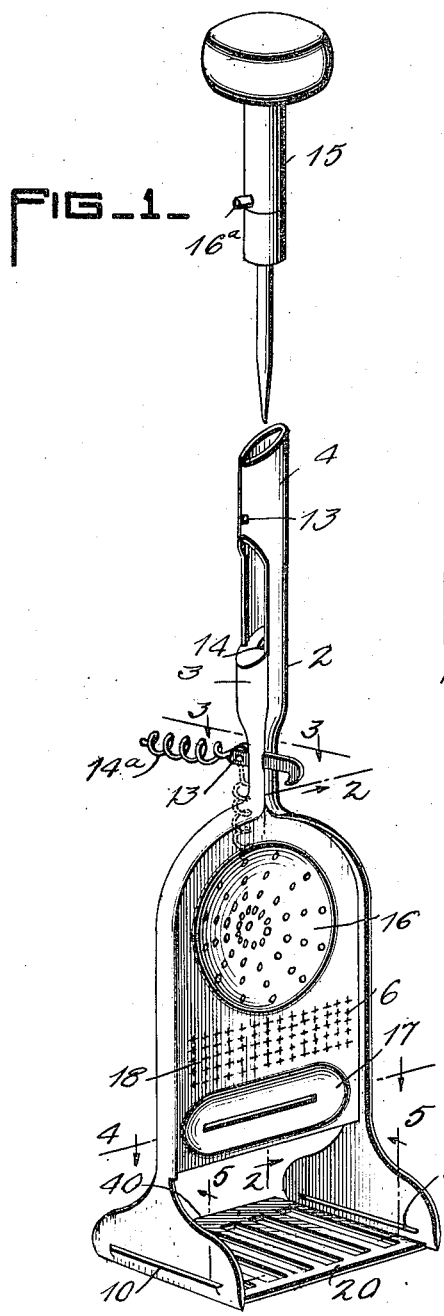
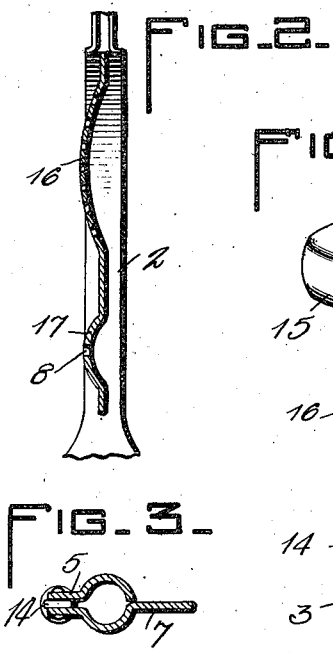
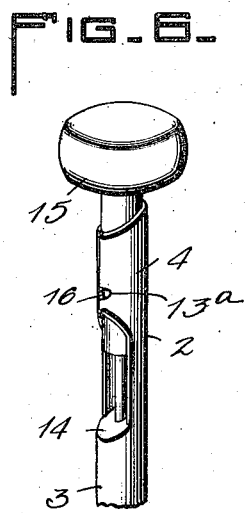
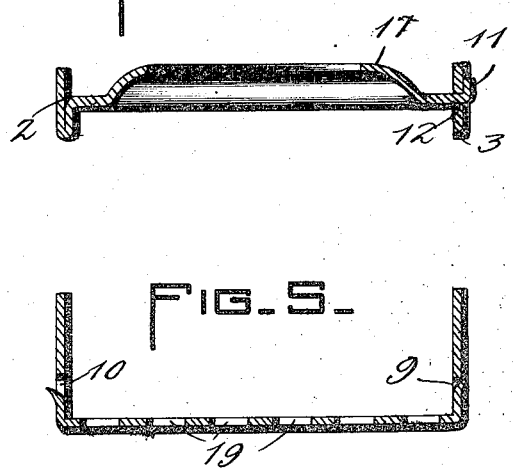
WITNESSES
INVENTOR
GEORGE E. HENRY,
BY
ATTORNEYS

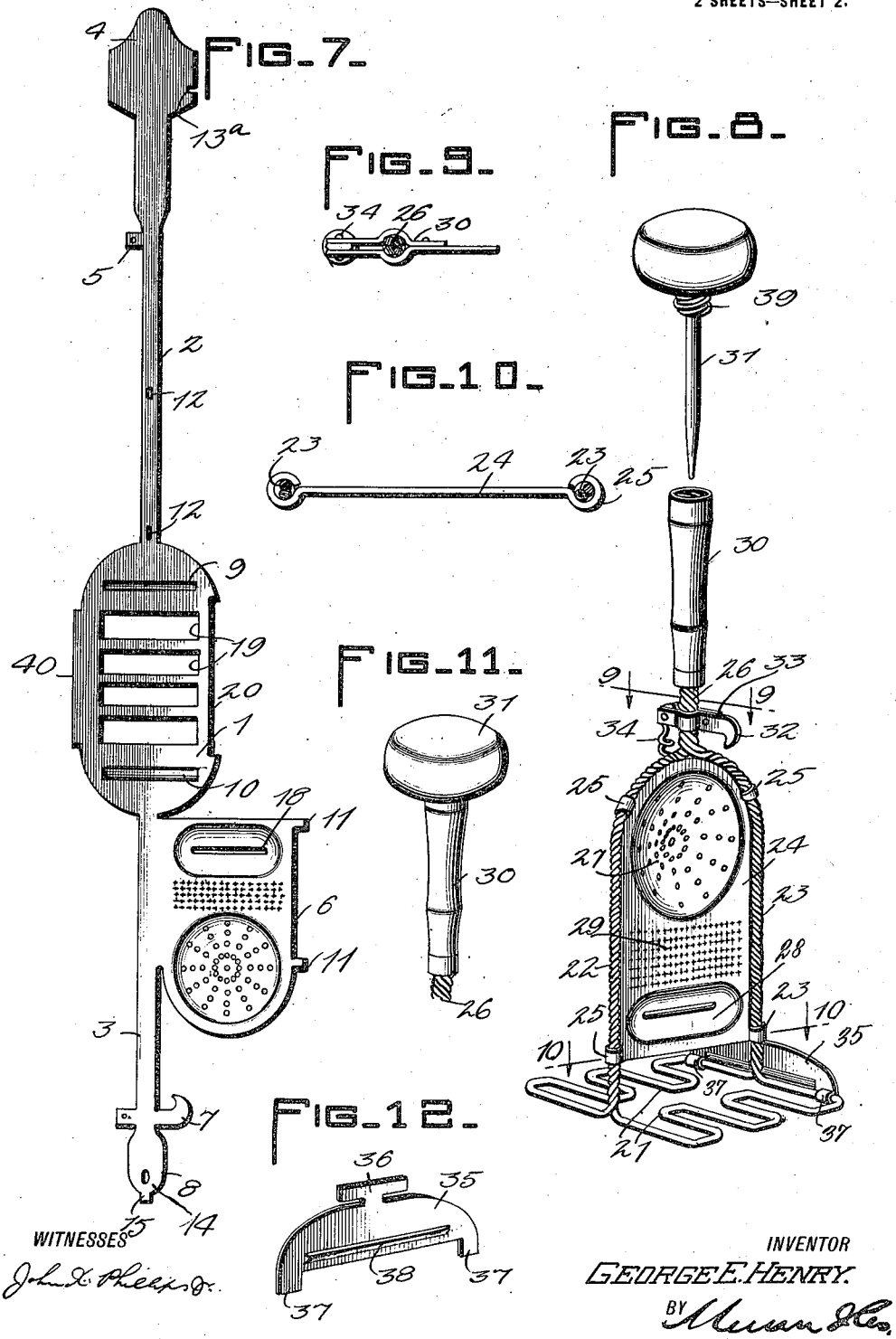

UNITED STATES PATENT OFFICE.

GEORGE EDMUND HENRY, OF PHILADELPHIA, PENNSYLVANIA.

KITCHEN UTENSIL.

1,237,040.  Specification of Letters Patent.  Patented Aug. 14, 1917.

Application filed September 13, 1916. Serial No. 119,823.

*To all whom it may concern:*

Be it known that I, GEORGE E. HENRY, a citizen of the United States, and a resident of Philadelphia, in the county of Philadelphia and State of Pennsylvania, have invented an Improvement in Kitchen Utensils, of which the following is a specification.

My invention is an improvement in kitchen utensils and the invention has for its object to provide a combination utensil especially adapted for kitchen use, in which a variety of tools are combined within a single article.

In the drawings:

Figure 1 is a perspective view of the improved utensil.

Figs. 2, 3, 4, and 5 are sections on the lines 2—2, 3—3, 4—4, and 5—5, respectively, of Fig. 1, each view looking in the direction of the arrows adjacent to the line.

Fig. 6 is a perspective view of the upper end of the utensil.

Fig. 7 is a plan view of a blank for forming the improved utensil.

Fig. 8 is a perspective view of a modified construction.

Figs. 9 and 10 are sections on the lines 9—9 and 10—10, respectively, of Fig. 8.

Fig. 11 is a perspective view of a portion of the ice pick.

Fig. 12 is a similar view of the vegetable slicer.

In the embodiment of the invention shown in Figs. 1 to 5, the utensil is formed from the blank shown in Fig. 7, and the said utensil comprises an ice pick, a cork screw, a cap remover, a strainer, an apple corer, an egg separator, a potato slicer, a potato masher, a vegetable slicer, and a dough cutter. With the exception of the ice pick and the cork screw, the device is an integral structure, stamped from a single piece of suitable sheet metal.

Referring to Fig. 7 the metal is stamped with a central portion 1 having longitudinally extending arms 2 and 3 at its ends, the arm 2 having a head 4 at its outer end and a laterally extending lug 5 intermediate its ends, while the arm 3 has an extension 6, near the central portion 1, a cross head 7 near its end, and an enlargement 8 at its end.

The utensil is formed by bending the arms of the blank at right angles to the body portion 1, the extension 6 being first bent at right angles to the plane of the blank. With the arms a portion of the body portion at each end is bent at right angles, and these portions have slots 9 and 10, respectively, whose lower edges are bent outwardly and sharpened, as shown, to form the potato slicer and the vegetable slicer. The extension 6 is provided with outwardly extending lugs 11 at the side remote from the arm 3, and the arm 2 has openings 12 for receiving these lugs, the said lugs being afterward bent laterally to hold the extension 6 between the arms and at right angles to the plane of the arms.

It will be noticed that that portion of the extension 6 remote from the body 1 is rounded, and after the parts are bent, as above described, the arms are bent over around this rounded portion into contact, as shown in Fig. 1. The lug 5 registers with one end of the cross head 7 and this lug and the end of the cross head have registering openings for receiving a rivet 13, which connects the cork screw 14ª and assists in holding the arms 2 and 3 together.

The head 4 of the arm 2 is bent into cylindrical form, as shown, with the side edges thereof in approximate contact, but spaced apart slightly, and one side edge has a notch 13ª, for a purpose to be presently described. The enlargement 8 of the arm 3 has an opening 14, and a lug 15 and when the parts are bent, as above described, this enlargement 8 is bent into the concaved portion of the arm 2, and the lug 15 engages an opening in the arm 2, to hold the enlargement 8 in the inclined position shown in Fig. 1.

The ice pick indicated generally at 15 is a separate article, comprising the pick proper and the head, as shown, and the shank portion of the pick is adapted to fit into the cylindrical portion formed by the head 4, with the laterally extending pin 16 on the shank portion passing down between the side edges of the head, and this pin is adapted to engage the notch 13ª when the pick is turned, to hold the pick in place. The point of the pick enters the opening 14 of the enlargement 8, as shown in Fig. 6. Those portions of the arms 2 and 3 above the cork screw and the head 4 of the arm 2, form a handle and a socket for receiving the ice pick. When so bent the head 7 will extend transversely of the shank of the utensil, and the cork screw may be folded into the dotted line position of Fig. 1, when not in use, or in the full line position in Fig. 1, when in use.

The extension 6 of the blank is provided with depressions 16 and 17, the former being circular and the latter oblong, and the depression 16 is provided with openings, forming a strainer. The portion 17 has a slot extending longitudinally thereof, and this depression forms an egg separator. Between the depressions a grater 18 is provided.

The body portion is provided with a series of parallel transverse substantially rectangular openings 19, and these openings permit the body portion to be used as a potato masher. At one side of the body, the body is cut away, as indicated at 20, and this cut away portion extends slightly beyond the outermost walls of the outermost slots. Beyond the cut away portion, the side edges of the body are sharpened to form cutting edges, and these cutting edges, when the body portion is bent as above mentioned, will extend beyond the potato masher, as shown in Fig. 1, to provide a dough cutter, for cutting squares, strips, and the like.

In the embodiment of the invention shown in Figs. 8 to 12, the utensil is formed from two pieces of wire, the wire being first bent to form the potato masher indicated at 21, and the ends of the wire are twisted together to form arms 22 and 23 which are bent around a plate 24 having a rounded upper end, and having lugs 25 near its ends for embracing the arms 22 and 23, to hold the plate in place. The extremities of the wires are then twisted together to form a shank 26. The plate 24 has a depression 27 forming a strainer, a depression 28 having a longitudinal slot forming an egg separator, and a roughened surface 29 between the depressions 27 and 28, and providing a grater. The depression 27 is circular while that 28 is oblong.

A substantially cylindrical casing 30 is connected with the shank 26, and this casing is adapted to receive the ice pick indicated at 31, the pick in Fig. 8 consisting of a point and a handle in the form of a button connected directly with the point. The cap remover indicated at 32 is arranged on the shank, the said remover being formed from a single strip of sheet metal having a hook at one end and a transverse groove for receiving the shank, and a plate 33 is arranged on the opposite side of the shank and is riveted to the strip to secure the parts together. A cork screw 34 is mounted on that rivet remote from the hook of the cap remover. The plate 33 has a transverse groove for receiving the shank 26, and the cork screw may be turned perpendicular to the long axis of the utensil or parallel therewith, as shown in Fig. 8. In Fig. 11 the ice pick is shown in position in the casing 30.

In Fig. 12 is shown the plate from which the vegetable slicer is formed. This plate 35 has one straight edge and one curved edge, and at the center of the curved edge the plate is provided with a T-shaped head 36. At the end of the straight edge the plate has lugs 37, and the plate is provided with a longitudinally extending slot having its lower edge bent outwardly and sharpened as indicated at 38 to provide a cutting edge for the purpose specified. This plate is arranged at the arm 23, the T-shaped head being bent around the arm, as shown, while the lugs 37 are bent around the adjacent side of the potato masher, and with the bent out edge of the slot outward.

In the construction of Fig. 5, the only difference between the slots 9 and 10 is that the slot 10 is of greater width, the cutting edge extending farther outward, and as a consequence the cutter at 10 will cut a thicker slice than the cutter at 9. In use, the potato masher is used in the ordinary manner. The ice pick when not in use provides a handle for the utensil, and when in use it is withdrawn, in Fig. 1, by turning the pick slightly, and in Fig. 8 by merely withdrawing the same.

It will be noticed in Fig. 8 that there is an enlargement indicated at 39 between the handle and the point for engaging the end of the casing 30 to hold the pick in place. The strainer and the egg separator as well as the grater are used in the ordinary manner, holding the utensil horizontal. The vegetable slicers are used in the usual manner, as are also the cap remover and the cork screw. The dough cutter is used by placing the beveled edges on the dough and drawing the device to cut a strip from the dough.

It will be noticed that that side edge of the body remote from the cut away portion is extended slightly to form a pan or kettle scraper, as indicated at 40. With this extended edge, pans, skillets, kettles, and the like may be scraped.

The socket 4 for the ice pick is beveled at its outer end, as indicated, to form an apple corer. This edge may be sharpened, if desired, and the apple may be cored in the usual manner. The core enters the socket, and is pushed through the same by the succeeding cores, passing out over the inclined portion of the arm 3 having the opening 14.

I claim:

1. A utensil of the character specified, formed from a blank and comprising a plate having its ends bent upward, and a handle connected with the bent up ends, said plate being extended beyond the bent up ends at one side edge and being cut away between the bent up ends at the other side edge, the said bent up ends being sharpened at the said last-named side edge.

2. A utensil of the character specified, formed from a blank and comprising a plate having its ends bent upward approximately perpendicular to the plate, and a handle connected with the bent up ends, and an egg separator held between the bent up ends in a plane approximately perpendicular to the plate.

3. A utensil of the character specified, formed from a blank and comprising a plate having its ends bent upward approximately perpendicular to the plate, and a handle connected with the bent up ends, and a grater held between the bent up ends in a plane approximately perpendicular to said plate.

4. A utensil of the character specified, formed from a blank and comprising a plate having its ends bent upward approximately perpendicular to the plate, and a handle connected with the bent up ends, the bent up ends having transverse slots, and the lower edges of the slots being bent outwardly and sharpened to form vegetable slicers.

GEORGE EDMUND HENRY.

Witnesses:
JAMES J. MALLOY,
FRED HENRY,
ANDREW F. GALLAGHER.